United States Patent
Horn et al.

(10) Patent No.: US 7,509,473 B2
(45) Date of Patent: Mar. 24, 2009

(54) SEGMENTED STORAGE SYSTEM MAPPING

(75) Inventors: Robert L. Horn, Yorba Linda, CA (US); Virgil V. Wilkins, Perris, CA (US)

(73) Assignee: Adaptec, Inc., Milpitas, CA (US)

( * ) Notice: Subject to any disclaimer, the term of this patent is extended or adjusted under 35 U.S.C. 154(b) by 553 days.

(21) Appl. No.: 10/778,149

(22) Filed: Feb. 17, 2004

(65) Prior Publication Data

US 2005/0050294 A1 Mar. 3, 2005

Related U.S. Application Data

(60) Provisional application No. 60/497,933, filed on Aug. 27, 2003.

(51) Int. Cl.
*G06F 12/00* (2006.01)
*G06F 12/10* (2006.01)

(52) U.S. Cl. .................. 711/206; 711/209; 711/216

(58) Field of Classification Search ......... 711/207–209, 711/216
See application file for complete search history.

(56) References Cited

U.S. PATENT DOCUMENTS

| 5,546,558 A | | 8/1996 | Jacobson et al. | |
|---|---|---|---|---|
| 5,584,005 A | * | 12/1996 | Miyaoku et al. | 711/206 |
| 5,987,478 A | * | 11/1999 | See et al. | 707/205 |
| 6,058,455 A | | 5/2000 | Islam | |
| 6,216,199 B1 | * | 4/2001 | DeKoning et al. | 711/3 |
| 6,219,752 B1 | | 4/2001 | Sekido | |
| 6,233,648 B1 | | 5/2001 | Tomita | |
| 6,393,544 B1 | * | 5/2002 | Bryg et al. | 711/220 |
| 6,487,636 B1 | | 11/2002 | Dolphin et al. | |
| 7,076,634 B2 | * | 7/2006 | Lambeth et al. | 711/206 |
| 2003/0079102 A1 | * | 4/2003 | Lubbers et al. | 711/202 |
| 2003/0126398 A1 | * | 7/2003 | Shinozaki | 711/206 |
| 2004/0205300 A1 | * | 10/2004 | Bearden | 711/137 |

* cited by examiner

*Primary Examiner*—Shane M Thomas
(74) *Attorney, Agent, or Firm*—Dickstein Shapiro LLP

(57) ABSTRACT

A system for mapping between logical addresses and storage units of a plurality of storage volumes which comprise a storage system. For each volume, logical addresses are mapped to storage units using a volume mapping table. Each volume mapping table is comprised of a plurality of segments. Each segment need not be contiguously allocated to another segment of the same table. Thus, each volume mapping table can be independently expanded or reduced without affecting other volume mapping tables. A hash function, a hash table, a segment table, and a redundancy group descriptor table may also be used to help manage the segments of the volume mapping tables.

28 Claims, 4 Drawing Sheets

SEGMENTED STORAGE SYSTEM MAPPING

This application claims the benefit of U.S. Provisional Application No. 60/497,933, filed Aug. 27, 2003, the disclosure of which is herein incorporated by reference in its entirety.

FIELD OF INVENTION

The present invention relates to a load balancing storage system which optimizes storage volume and communication channel utilization.

BACKGROUND OF THE INVENTION

In conventional RAID storage systems, redundancy groups are established for any RAID type (i.e., RAID 0, RAID 5, "just a bunch of disks"(JBOD), etc.). Redundancy groups typically contain from one to sixteen drives and are chosen from the set of all available drives. The drives associated with a particular redundancy group need not be contiguous or in any special order. The stripe size for a particular redundancy group is configurable, and there may be an optional per drive logical block address (LBA) offset available. Redundancy groups may be linked to support mirroring to any other drive in the system, also known as N-way mirroring. Fixed cluster sizes enable mapping templates for the entire drive LBA space. In this manner, any physical drive LBA may be addressed by selecting the correct redundancy group and cluster to access. Furthermore, a single drive may belong to more than one redundancy group. Firmware resolves potential mapping conflicts by allocating clusters in one redundancy group that do not conflict with previously allocated clusters from another redundancy group.

FIG. 1 illustrates a flat system mapping table 100, including a system mapping table 110 which holds cluster descriptors. Each cluster descriptor includes a pointer 150a, 150b, ..., 150c to a particular redundancy group and a cluster number 160a, 160b, ..., 160c corresponding to the cluster allocated to that redundancy group. Each volume is defined by a set of sequential cluster descriptors. The volume LBA contains a volume map pointer and a cluster offset. The volume map pointer, contained in the upper bits of the volume LBA, gives an offset from the base of the flat volume map to the correct volume cluster descriptor. The volume cluster descriptor contains the redundancy group pointer and the corresponding cluster number. The redundancy group pointer points to the correct redundancy group descriptor in the redundancy group descriptor table. Thus, for a flat map, the redundancy group descriptor, the cluster number, and cluster offset are all fed into a mapping engine to arrive at the physical drive address.

In a flat volume map, each volume map entry must reside within a contiguous block of memory; it is therefore difficult to expand a particular volume map. Expanding a volume map requires moving all subsequent volume maps farther down the table to accommodate the new, larger map. Defragmentation is then required to realign the memory table. Large volume maps may require pausing volume activity during the move, which creates system latency. Additionally, volume map table manipulation may require large metadata update operations, which are processor intensive and adversely affect system performance.

U.S. Pat. No. 5,546,558, entitled, "Memory System with Hierarchic Disk Array and Memory Map Store for Persistent Storage of Virtual Mapping Information," hereinafter the '558 patent, describes a data memory system that has a hierarchical disk array of multiple disks, a disk array controller for coordinating data transfer to and from the disks, and a RAID management system for mapping two different RAID areas onto the disks. The RAID management system stores data in one of the RAID areas according to mirror redundancy, and stores data in the other RAID area according to parity redundancy. The RAID management system then shifts or migrates data between the mirror and parity RAID areas on the disks in accordance with a predefined performance protocol, such as data access recency or access frequency. The data memory system also includes a memory map store embodied as a non-volatile RAM. The memory map store provides persistent storage of the virtual mapping information used by the RAID management system to map the first and second RAID areas onto the disks within the disk array. The RAID management system updates the memory map store with new mapping information each time data is migrated between mirror and parity RAID areas.

The method described in the '558 patent uses the conventional flat volume mapping approach and therefore does not offer a solution to the latency problems caused by manipulating the memory map store each time data migrates in the system. The '558 patent does not address defragmentation or system memory resource issues. Finally, the method described in the '558 patent does not offer a mechanism for reducing the amount of data required in the memory map stores.

Therefore, it is an object of the present invention to provide a method of mapping volume tables that allows expandable volume maps with no system performance impact.

It is another object of this invention to provide a method of expanding volume maps without requiring defragmentation.

It is yet another object of this invention to provide a method of mapping volume tables such that large volume maps may be reduced in size in order to improve system performance.

It is yet another object of this invention to provide a method of mapping volume tables such that minimal metadata updates are required and system performance is not adversely impacted.

SUMMARY OF THE INVENTION

The present invention is directed to an apparatus and method for providing an efficient mechanism for mapping between logical addresses and storage units of a plurality of storage volumes which comprise a storage system. For each volume, logical addresses are mapped to storage units using a volume mapping table. Each volume mapping table is comprised of a plurality of segments. Each segment need not be contiguously allocated to another segment of the same table. Thus, each volume mapping table can be independently expanded or reduced without affecting other volume mapping tables. A hash function, a hash table, a segment table, and a redundancy group descriptor table may also be used to help manage the segments of the volume mapping tables.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
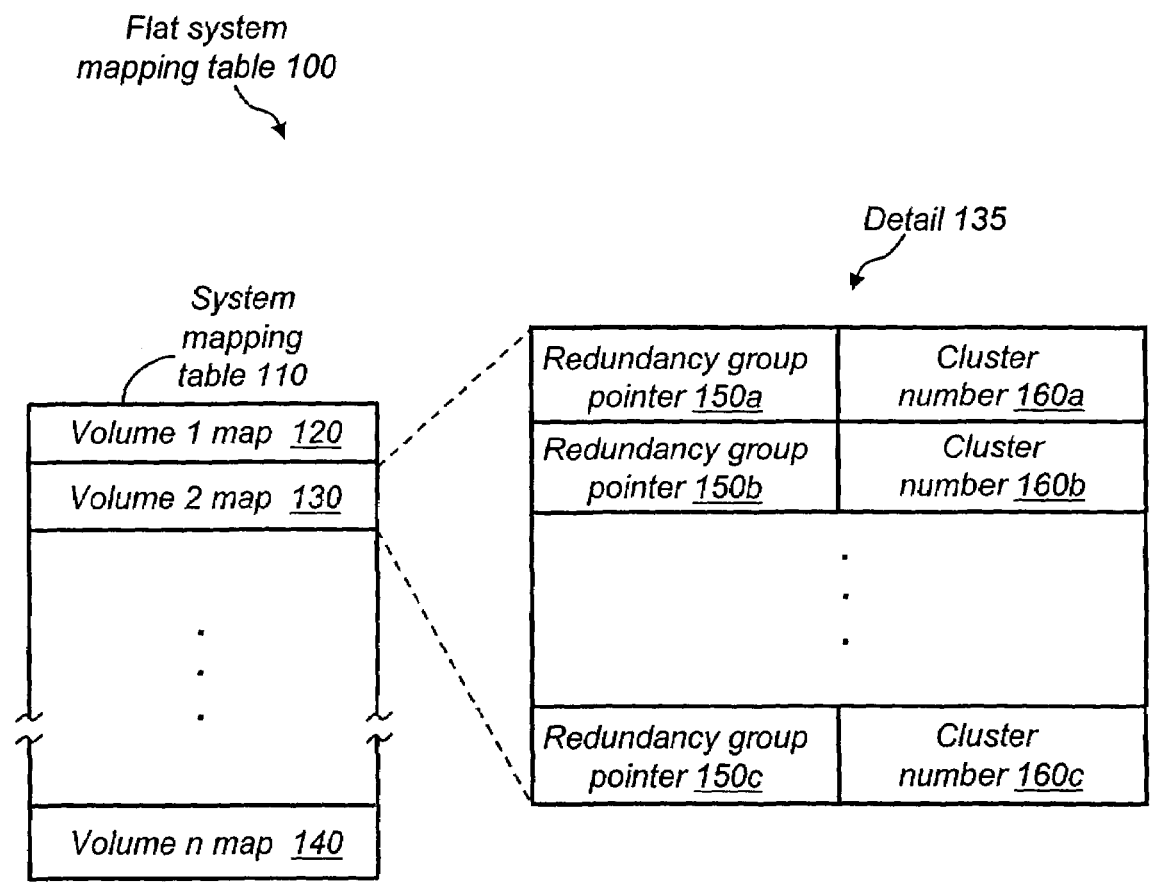
FIG. 1 is a diagram of a conventional flat system volume mapping table.

Now referring to the drawings, where like reference numerals designate like elements, there is shown in FIG. 1 a diagram of a flat system mapping table 100 used in conventional storage controller architectures. Flat system mapping table 100 includes a system mapping table 110 that further includes a volume 1 map 120, a volume 2 map 130, and a volume n map 140. (In general, "n" is used herein to indicate an indefinite plurality, so that the number "n" when referred to one component does not necessarily equal the number "n" of a different component). A detail 135 of volume 2 map 130 includes a redundancy group pointers 150a 150b, and 150c, a cluster number 160a, a cluster number 160b, and a cluster number 160c.

As mentioned previously, each volume map entry of flat system mapping table 100 is contiguous in memory. Therefore, in order to expand volume 2 map 130, for example, all subsequent volume map entries including volume n map 140 must be shifted the required number of memory addresses, a new redundancy pointer must be added after redundancy group pointer 150c, and a new cluster number must be added after cluster number 160c in volume 2 map 130. The number of system processor cycles required to perform manipulations of flat system mapping table 100 is proportional to the number and size of volume map entries it contains. Therefore, the greater the number of entries and the larger each entry, the more processing time is required, leading to more system latency and lower system performance.

Figure 2:
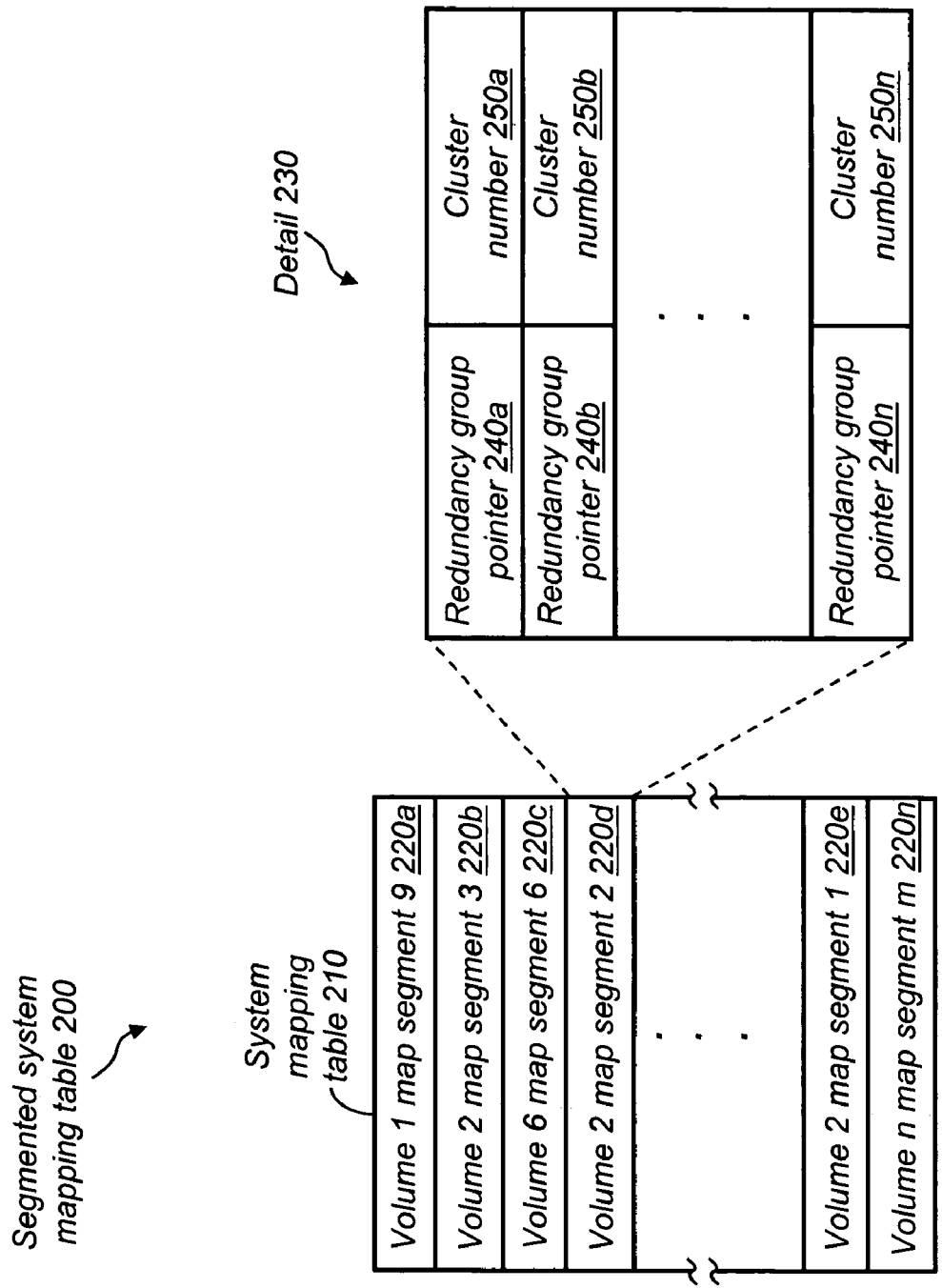
FIG. 2 is a diagram of a segmented system volume mapping table.

FIG. 2 shows a segmented system mapping table 200 that includes a system mapping table 210. System mapping table 210 further includes a volume 1 map segment 9 220a, a volume 2 map segment 3 220b, a volume 6 map segment 6 220c, a volume 2 map segment 2 220d, a volume 2 map segment 1 220e, and a volume n map segment m 220n. These entries are shown as examples only and may have any label. A detail 230 of volume 2 map segment 2 220d includes a redundancy group pointer 240a with a corresponding cluster number 250a, a redundancy group pointer 240b with a corresponding cluster number 250b, and so on until volume 2 map segment 2 220d entry concludes with a redundancy group pointer 240n and a corresponding cluster number 250n.

Because volume map segments need not be contiguous in system mapping table 210, new volume map segment entries may be added to the end of system mapping table 210. A hash function is used to correlate the new volume map entry with its associated volume number; thus, volume map segments need not be collocated in memory according to volume number. Furthermore, segmented mapping requires that no system mapping table 210 volume map segments need to be moved in memory in order to expand volume maps.

Each volume map segment is of a predetermined size and has a fixed number of entries. For example, in one exemplary embodiment, each volume map segment is 4 Kbyte in size. The size of each volume map segment may be any logical value depending on system needs and optimization. Because each volume map segment is the same size and holds the same number of entries, volume map segments may be deleted and reallocated without moving any other volume map segment. Therefore, no defragmentation is required and the processor does not need to perform any additional manipulation of system mapping table 210. Additionally, segmented system mapping table 200 provides a means for processing smaller amounts of data, thus increasing system performance over the conventional method. That is, since new volume map segments are only created when required and deleted when no longer required, only those segments of a volume map table which correspond to allocated storage units need to be maintained in the storage system. Thus, for segmented approach of the invention requires a storage system to manage a lesser amount of volume mapping data as long as the storage units are not full.

Figure 3:
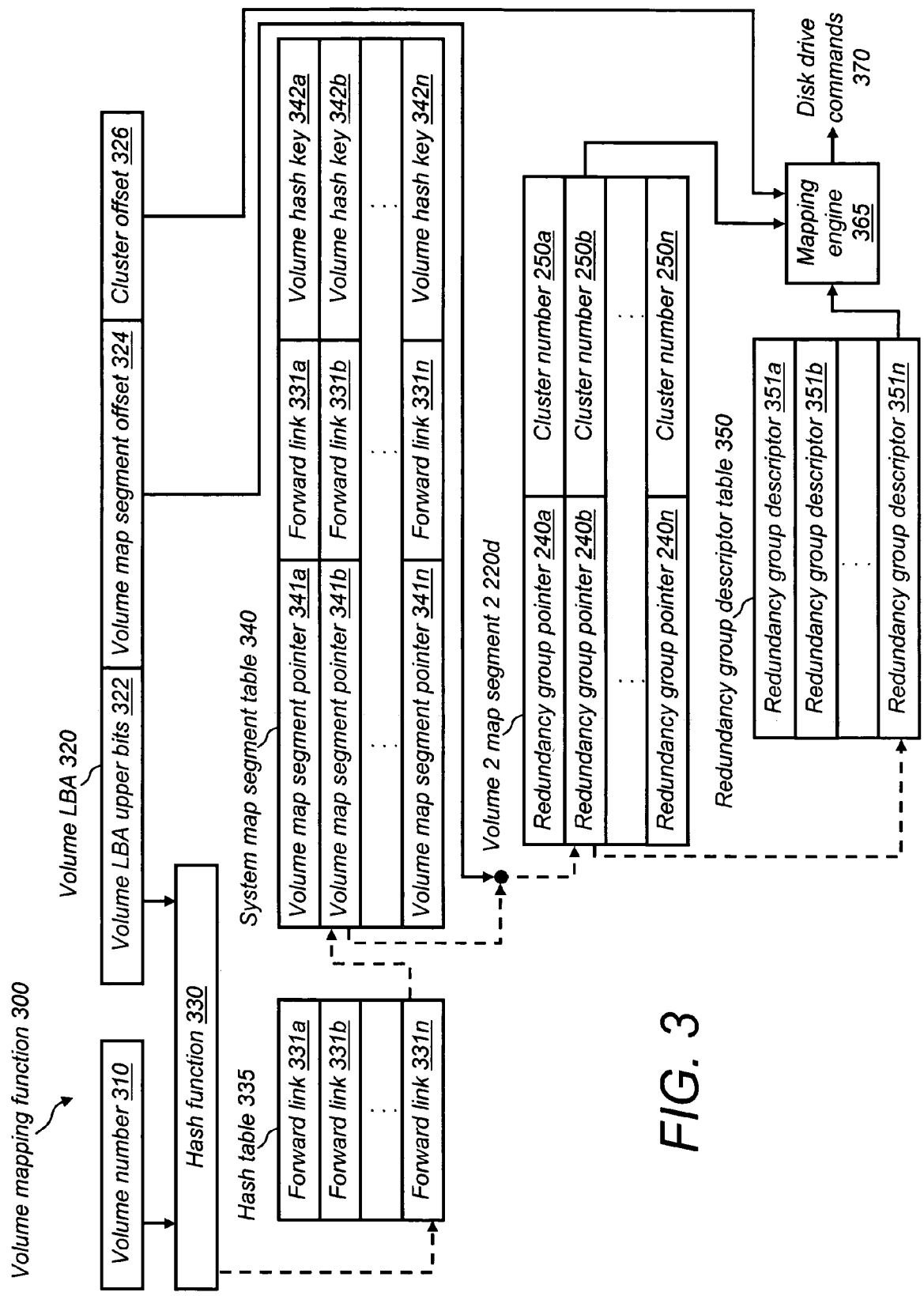
FIG. 3 is a diagram of the preferred embodiment segmented mapping function.

FIG. 3 is a preferred embodiment of a volume mapping function 300 that includes a volume number 310 and a volume LBA 320. Volume LBA 320 further includes a plurality of volume LBA upper bits 322, a volume map segment offset 324, and a cluster offset 326. Volume mapping function 300 further includes a hash function 330 and a hash table 335. The hash table 335 include entries comprising forward links 331a, 331b, . . . , 331n. The hash table 335 is addressed by using a hash function 330 upon the volume number 310 and volume LBA upper bits 332. The forward links 331a, 331b, . . . , 331n of the hash table 335 point to different entries of a system map segment table 340.

The system map segment table 340 is another component of the volume mapping function 300. Each entry of the system map segment table 340 includes a volume map segment pointer 341a, 341b, . . . , 341n, a forward link 331a, 331b, . . . , 331n, and a volume hash key 342a, 342b, . . . , 342n. Each volume map segment pointer 341a, 341b, . . . , 341n points to a segment of a volume mapping table. For example, volume map segment pointer 341b points to the segment 2 of the volume mapping table for volume 2 220d. The volume map segment offset 342 is used to address a particular entry in a given segment of a volume mapping table. Each forward link 331a, 331b, . . . , 331n points to another entry in the system map segment table 340 which corresponds to a next segment of the same volume mapping table. If there is no next segment, the forward link 331a, 331b, . . . , 331n is set to a predetermined value. The volume hash key 342a, 342b, . . . , 342n is used to store a same hash key produced by hash function 330 when addressing the corresponding entry in hash table 335.

Each segment of a volume mapping table include entries each of which includes a redundancy group pointer 240a, 240b, . . . , 240n and a respective cluster number 250a, 250b, . . . , 250n. The volume mapping function 300 further include a redundancy group descriptor table 350. Each entry of the redundancy group descriptor table 350 includes a redundancy group descriptor 351a, 351b, . . . , 351n. Additionally, volume mapping function 300 includes a mapping engine 365 and a plurality of disk drive commands 370.

When a volume expands, a new segment is added to system map segment table 340, including volume map segment pointer 341n, forward link 331n, and volume hash key 342n. The corresponding forward link 331n to the new entry is added to hash table 335. As segments are deleted, hash table 335 deletes the corresponding forward link.

System map segment table 340 holds volume segment map pointers to specific volume map segments, as well as forward links and volume hash keys. In this example, volume map segment pointer 341b points to volume 2 map segment 2 220d. Using volume map segment offset 324, the controller is able to find redundancy group pointer 240b and cluster number 250b. Redundancy group pointer 240b points to redundancy group descriptor 351n in redundancy group descriptor table 350.

Mapping engine 365 resolves redundancy group descriptor 351n, in combination with cluster number 250b and cluster offset 326, into disk drive commands 370, which are in turn sent to the storage element controllers.

Figure 4:
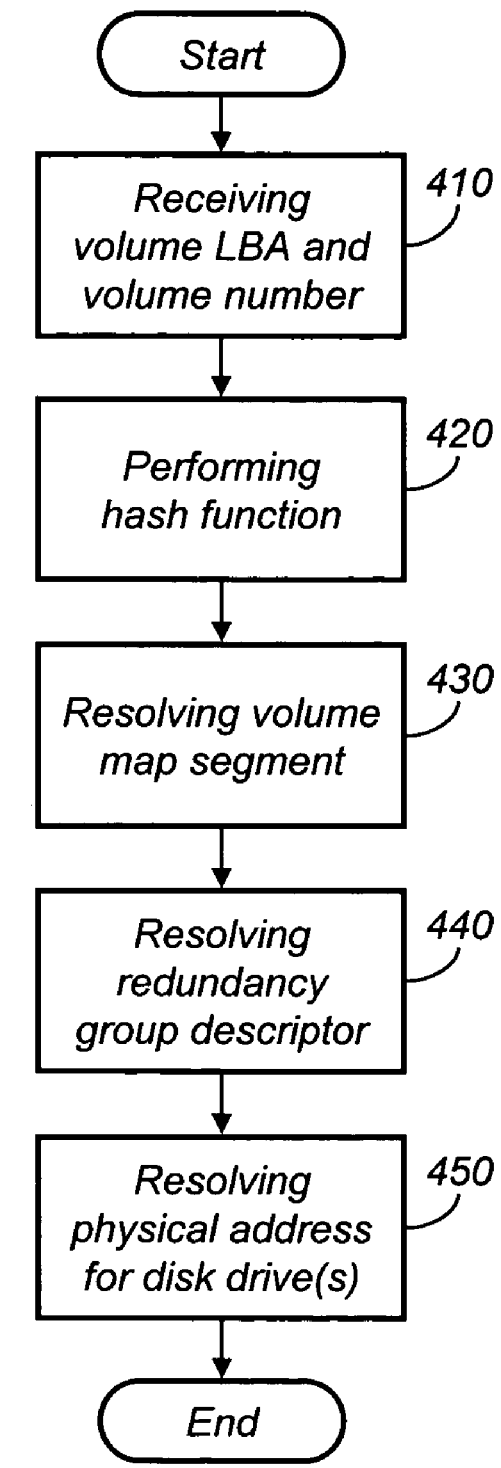
FIG. 4 is a flow diagram of a method of using a segmented system mapping table.

FIG. 4 is a flow diagram of a segmented volume mapping method 400.

Step 410: Receiving volume LBA and volume number

In this step, the system controller (not shown) resolves a host request into volume number 310 and volume LBA 320. Method 400 proceeds to step 420.

Step 420: Performing Hash Function

In this step, the hash function 330 is applied to the volume number 310 and volume LBA upper bits 322 of volume LBA 320. The result of the hash function 330 is used as an index to locate an entry in the hash table 335 having a forward link 331n which points to the correct volume map segment pointer 341b in system map segment table 340. It should be noted that in large storage systems may have large volume mapping tables. In such systems, the volume mapping table may be implemented as a swappable table, that is, if the volume mapping table is sufficiently large, only a portion of the volume mapping table is resident and the remainder of the table may be swapped to another storage medium, where it can be retrieved when needed. Under such circumstances, when a new segment is created, an existing segment of the volume mapping table will need to be swapped out to the another storage medium. A least recently used (LRU) technique may be used to govern which portion of the volume mapping table is swapped to the another storage medium when required. Method 400 proceeds to step 430.

Step 430: Resolving Volume Map Segment

In this step, volume map segment pointer 341b points to the correct volume map segment, which is volume 2 map segment 2 220d in this example. Cluster offset 326 from volume LBA 320 is used to find redundancy group pointer 240b and cluster number 250b. Method 400 proceeds to step 440.

Step 440: Resolving Redundancy Group Descriptor

In this step, redundancy group pointer 240b links to redundancy group descriptor 351n in redundancy group descriptor table 350. Redundancy group descriptor 351n is fed to mapping engine 365. Method 400 proceeds to step 450.

Step 450: Resolving Physical Address for Disk Drive(s)

In this step, mapping engine 365 uses information from redundancy group descriptor 351n, cluster number 250b from volume 2 map segment 2 220d, and cluster offset 326 from volume LBA 320 to resolve the physical disk address and commands. Mapping engine 365 then sends disk drive commands 370 to the corresponding drive(s). Method 400 ends.

Thus, the present invention provide for an apparatus and mechanism for efficiently mapping between logical addresses and storage units in a storage system. The invention may be practiced in any storage system having a plurality of storage volumes, including, for example, stand alone disk array storage systems, network attached storage (NAS) systems, storage area networks (SANs), and storage routers.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A storage system, comprising:
 a plurality of storage volumes;
 a storage controller, coupled to said plurality of storage volumes, said storage controller further comprising:
  a processor;
  a memory, coupled to said processor; and
  a system mapping table stored in said memory;
 wherein,
  for each of said plurality of storage volumes, said processor manages in said memory a respective volume mapping table, each entry of the volume mapping table associating a redundancy group with a storage unit of one of said plurality of storage volumes;
  at least one of said volume mapping tables is comprised of a plurality of segments of sequential segment number and logical block address range organized non-sequentially in the system mapping table; and
  each entry of the system mapping table being associated with a group of logical addresses via a hash value, each logical address being comprised of a volume number and a volume logical block address, the hash value resulting from the application of the volume number and a predetermined portion of the volume logical block address to a hash function.

2. The storage system of claim 1, wherein a storage unit is a cluster within a storage volume.

3. The storage system of claim 1, wherein said storage system is a networked storage system and said storage controller further comprises at least one network interface coupled to said processor.

4. The storage system of claim 1, wherein each volume mapping table is comprised of one or more equal sized segments.

5. The storage system of claim 1, further comprising:
 a redundancy group descriptor table, each entry of said redundancy group descriptor table including a data structure identifying a specific redundancy group.

6. The storage system of claim 5, wherein said volume mapping table associates a redundancy group with a storage unit by associating a pointer to an entry of said redundancy group descriptor table with a cluster number.

7. The system of claim 1, wherein said storage system is a networked storage system further comprising:
 at least one network interface coupled to said storage controller.

8. The system of claim 7, wherein said storage system is a network attached storage.

9. The system of claim 7, wherein said storage system is a storage area network.

10. The system of claim 7, wherein said storage system is a storage router.

11. A storage system, comprising:
 a plurality of storage volumes;
 a storage controller, coupled to said plurality of storage volumes, said storage controller further comprising:
  a processor; and
  a memory, coupled to said processor;
 wherein said processor maps between logical addresses and storage units by managing in said memory,
  a system mapping table;
  a plurality of volume mapping tables, each corresponding to a respective storage volume, each comprised of a plurality of segments of sequential segment number and logical block address range organized non-sequentially in the system mapping table, with each segment including a plurality of entries for associating a redundancy group with a storage unit; and a hash table, having a plurality of entries, each entry associating a group of logical addresses with a different entry of said system mapping table, each logical address being comprised of a volume number and a volume logical block address, and each entry representing a hash value resulting from the application of the volume number and a predetermined portion of the volume logical block address to a hash function.

12. The storage system of claim 11, wherein each volume logical block address is comprised of:

a group of volume upper bits, said group of volume upper bits being a predetermined number of upper bits of said volume logical block address;

a group of cluster offset bits, said group of cluster offset bits being a predetermined number of low bits of said volume logical block address; and a group of map segment offset bits, said group of map segment offset bits being a predetermined number of intermediate bits between said group of volume upper bits and said group of cluster offset bits.

13. The storage system of claim 12, wherein each group of logical addresses associated with a same entry in said system mapping table consists of those logical addresses which share a same hash value when the predetermined portion of each volume logical block address is applied to the hash function.

14. The storage system of claim 13, wherein said predetermined portion of each volume logical block address comprises the group of volume upper bits.

15. The storage system of claim 14, wherein each entry of said system mapping table further comprises a link to another entry of said system mapping table.

16. The storage system of claim 15, wherein each entry of said system mapping table further comprises:

a hash key field, for storing a portion of the logical address which was applied to said hash function.

17. The storage system of claim 11, wherein each entry of said system mapping table further comprises a link to another segment; and each of said another segment has a logical address which yields a same result when a same predetermined portion of each volume logical block address is applied to said hash function.

18. The storage system of claim 11, wherein an entry of a volume mapping table can be addressed by a set of intermediate logical block address bits associated with said entry.

19. A method for accessing a storage system, comprising:

receiving a logical address comprising a volume number and a logical block address; and finding, in a segment of a volume mapping table associated with said volume number, an entry having an association between said logical block address and a storage unit of said storage system the step of finding comprising:

combining the volume number and a predetermined portion of the logical block address to produce a key; and hashing said key to produce an index, wherein if said step of finding is successful, accessing the storage unit in a volume associated with the volume number;

if said step of finding is unsuccessful, and if said entry is allocated but not present, retrieving said entry; and if said step of finding is unsuccessful, and if said entry is not allocated, allocating said entry of said volume mapping table, wherein segments of sequential segment number and logical block address range of a same volume mapping table are organized non-sequentially in a system mapping table that includes the volume mapping table.

20. The method of claim 19, wherein said step of allocating a new segment of said volume mapping table comprises:

allocating a memory space for said new segment of said volume mapping table; and adding a new entry to the system mapping table, said new entry including a pointer to said memory space.

21. The method of claim 20, wherein in said step of allocating a new segment of said volume mapping table further comprises:

setting a forward link portion of an entry of said system mapping table corresponding to a segment of said volume mapping table having a same hash function result as said new segment to point to said new segment.

22. The method of claim 19, wherein said step of finding comprises:

retrieving a forward link from a hash table using said index;

following said forward link from said hash table to an entry in the system mapping table;

finding an entry in said system mapping table by comparing the key against contents of a key field and retrieving a second forward link from an entry in said system mapping table having a key field identical to the key;

following said second forward link to a segment of the volume mapping table; accessing said segment of the volume mapping table using a portion of said logical block address to retrieve a cluster number associated with said volume number and said logical block address; and accessing the storage unit associated with said cluster.

23. The method of claim 19, wherein said step of finding comprises:

retrieving a forward link from a hash table using said index;

following said forward link from said hash table to an entry in the system mapping table;

retrieving a second forward link from said system mapping table;

following said second forward link to a segment of the volume mapping table;

accessing said segment of the volume mapping table using a portion of said logical block address to retrieve a cluster number, and a redundancy group descriptor, wherein said cluster number and said redundancy group descriptor are associated with said volume number and said logical block address; and accessing storage units associated with said cluster number and redundancy group descriptor.

24. The method of claim 23, wherein said redundancy group descriptor is accessed by following a redundancy group pointer from said segment of the volume mapping table to an entry of a redundancy group descriptor table.

25. A storage system, comprising:

a plurality of storage volumes, each including a plurality of storage units which can be allocated;

a storage controller, coupled to said plurality of storage volumes, said storage controller further comprising:

a processor;

a memory, coupled to said processor; and a system mapping table stored in said memory;

wherein,
for each of said plurality of storage volumes, said processor manages in said memory, a respective volume mapping table comprising a plurality of table segments,
said memory includes only those table segments which correspond to allocated storage units,
wherein at least some table segments of sequential segment number and logical block address range of a respective volume mapping table are organized non-sequentially in the system mapping table, each entry of the system mapping table being associated with a group of logical addresses via a hash value, each logical address being comprised of a volume number and a volume logical block address, the hash value resulting from the application of the volume number and a predetermined portion of the volume logical block address to a hash function.

26. The system of claim 25, wherein said processor deletes a table segment when all the storage units corresponding to said table segment are no longer allocated.

27. The system of claim 25, wherein said processor adds a new table segment when a storage unit not associated with any of said plurality of table segments is allocated.

28. A method for allocating storage in a storage system, comprising:
receiving a logical address comprising a volume number and a logical block address;
finding, in a pool of segment tables which comprise a volume mapping table associated with said volume number, a particular segment table associated with said volume number and said logical block address, the step of finding comprising:
combining the volume number and a predetermined portion of the logical block address to produce a key; and
hashing said key to produce an index;
if said finding step is successful, storing an indication in said particular segment table indicating that a storage unit having an address corresponding to said volume number and said logical block address has been allocated; and
if said finding step is not successful,
allocating a new segment table, said new segment table being associated with a plurality of storage units, said plurality of storage units including the storage unit having an address corresponding to said volume number and said logical block address; and
storing the indication in said new segment table,
wherein at least some segments of sequential segment number and logical block address range of a same volume mapping table are organized non-sequentially in a system mapping table that includes the volume mapping table.

* * * * *